Jan. 22, 1924.
A. LEGNANI
1,481,718
PHOTOGRAPHIC CAMERA
Filed Nov. 10, 1922  2 Sheets-Sheet 1
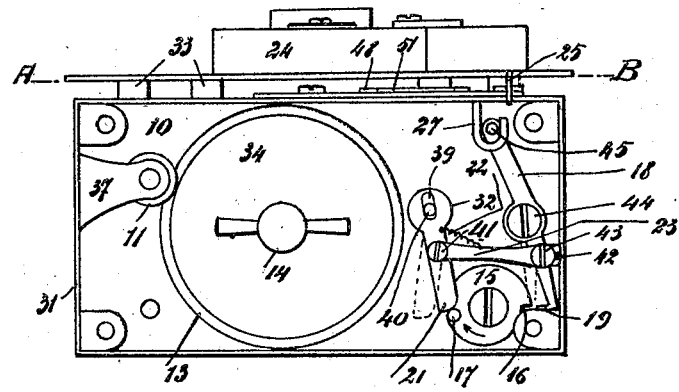
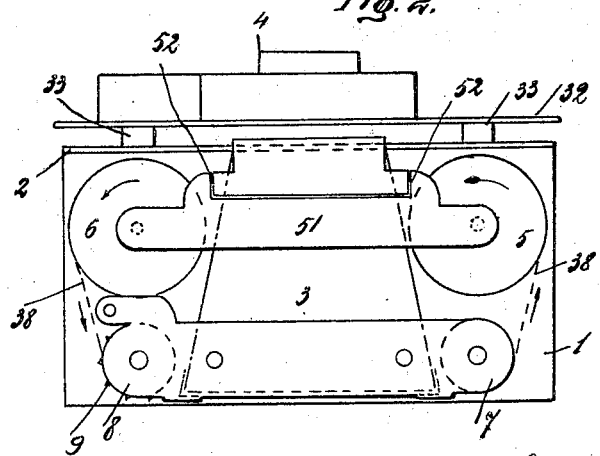

Jan. 22, 1924.  1,481,718
A. LEGNANI
PHOTOGRAPHIC CAMERA
Filed Nov. 10, 1922   2 Sheets-Sheet 2
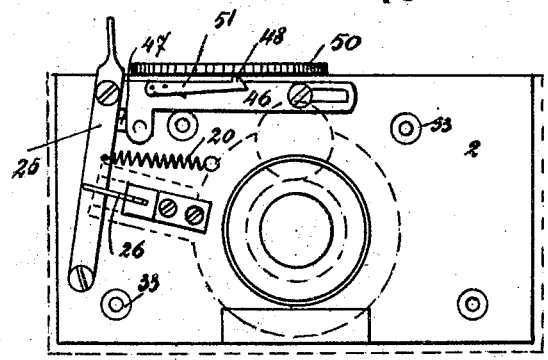
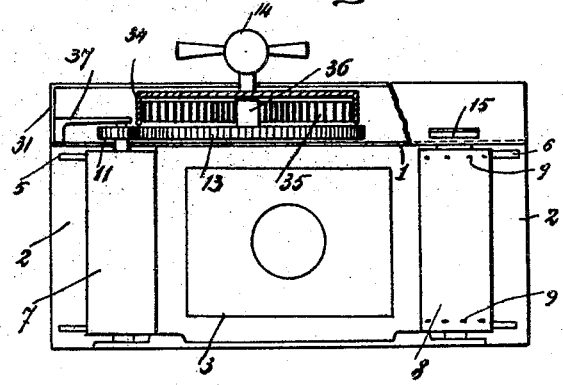
Angelo Legnani
Inventor
by Steward & McKay
his attorneys Patented Jan. 22, 1924.

1,481,718

UNITED STATES PATENT OFFICE.

ANGELO LEGNANI, OF TURIN, ITALY.

PHOTOGRAPHIC CAMERA.

Application filed November 10, 1922. Serial No. 600,094.

*To all whom it may concern:*

Be it known that I, ANGELO LEGNANI, subject of the King of Italy, and residing at Turin, in the Kingdom of Italy, have invented certain new and useful Improvements in Photographic Cameras, of which the following is the specification.

The present invention has for object certain improvements in photographic cameras. These improvements consist of a device which allows of automatically effecting—by means of the exposure release lever—the movement of the exposed sensitive surface out of the range of the lens, and replacing same with an equal length of unexposed sensitive surface.

According to this invention, the device which automatically effects said movement of the sensitized surface consists of a drum which, under the action of a spring is obliged to revolve and transmit this rotation, by means of suitable transmission organs, to the spool on which the exposed surface must be wound. This film surface is unrolled from another spool, passing over stretching reels, which hold the film stiff behind the lens. The axle of one of these stretching reels is provided with a disc, which has a tooth on its circumference and a projection on one side, said tooth and projection being alternatively able to come into contact with other parts, viz: the former with the hooked end of a lever which is connected to the exposure release lever, and the latter with the end of another lever which is connected to the other one in a loose manner by means of a small arm. Said levers, together with the disc, form an escapement mechanism which allows the stretching reel (to which the disc is fixed) to make one complete revolution each time exposure lever is used. The reel is provided with pin-points, which cause the spring drum to pull forward the sensitized surface for a length which corresponds to that of the circumference of the reel, and which also exactly corresponds to the length of a photograph.

The invention is represented on the attached drawing, as being applied to a ribbon film camera.

Fig. 1 is a plan view of a camera without its cover and without the exposure-counter device.

Fig. 2 is a plan view from underneath without the bottom.

Fig. 3 is a sectional view along the line A—B of Fig. 1.

Fig. 4 is a back view without the box part of the camera.

A frame is formed by the two small plates 1 and 2 placed perpendicularly to each other, and in same is fixed a trunk-shaped chamber 3, of which the narrower end is placed near the lens and the broader one, also open, in front of the sensitized surface. The lens 4 is fixed to the plate 32, parallel to the plate 2 and separated from the latter by the studs 33.

At the sides of the chamber 3 there are the two spools 5 and 6, placed before the two reels 7 and 8, the latter one bearing at its ends the pin-points 9. The plate 1 forms the bottom of a box 31 (Figs. 1 and 4), in which is placed a drum 34, which—by means of the knob 14 which is fixed outside the camera—can be turned on its axis in one direction only so as to wind up a spiral spring 35 which is fixed at one end to the drum and at the other to a pivot 36, the latter being attached to a pinion 13. The teeth of this pinion engage with those of a smaller pinion 11, which is supported by a bracket 37 and whose axle goes through the bottom 1 of the box 31, forming a stiff connection with the axle of the spool 5 on which the sensitive surface 38 is wound from the spool 6 after having passed over the reels 8 and 7. The reel 8, bearing the pin-points 9, has an axle which is prolonged through the bottom 1 of the box 31, and same bears a disc 15 which has on its circumference a tooth 16, and, on one side, a projection 17. When the camera is at rest the end of the lever 21 bears on the projection 17; said lever 21 has a longitudinal slot 39 in its other end, in which there is the shank of a screw 40. The object of this lever is to prevent the reel 8 from revolving around its axis, and consequently to prevent the movement of the sensitive surface 38. Between the two ends of the lever 21 there is pivotally fixed at 41 the end of a small arm 23, the other end of which is slotted at 42 and fixed by means of the shank of a screw 43 to the lower half of a bell-crank lever 18, pivoted at 44 (Fig. 1). The lower end of said lever 18 is provided with a hook 19, while its upper end is connected by an articulation at 45 with a hook 27, which passes through a slot 47 of the side of the box 31 and is firmly fixed to a horizontal arm 46. This arm is properly guided and connected to the exposure release lever 25 (Fig. 3), which, by means of the small arm 26 is connected to the release itself and kept in position when at rest by the retaining spring 20. The spools 5 and 6 are interchangeable, and are of any suitable or known construction.

The apparatus also includes a counting mechanism for counting the photographs taken, and same consists (Fig. 3) of a hook 48 at the end of a small arm 51 having a spring action; this hooked spring arm is fixed to the afore-mentioned horizontal arm 46 and can engage with the teeth of the circumference of disc 50.

The manner of working of the apparatus is as follows:

When the lever 25 is moved (against the tractive action of the spring 20), the lever 18 is also moved and brought into such a position as to make its hook 19 engage with the tooth 16 of the disc 15. At the same time the small arm 23 will push the lever 21 so as to disengage its end from the projection 17 of the disc 15, lever 21 sliding and swinging to the position indicated by the dotted lines on Fig. 1. It follows that, as the disc 15, and therefore the reel 8, can only turn in the direction indicated by the arrow, the hook 19 will prevent their turning. When the pressure is taken off the lever 25, both the latter and the lever 18 will automatically return to their normal position when at rest, thanks to the spring 20. During a first part of this return movement, however, owing to the slot 42 in the small arm 23, the lever 18 will not have any effect on the lever 21, but, in the ultimate phase of its return movement, it will—owing to the spring 22 acting on the arm 23—pull and bring the lever 21 back into its normal or "rest" position, as shown by the full lines (Fig. 1), and thus again make it come into contact with the projection 17 of the disc 15. In this position the lever 21 will stop the rotation of the disc 15, and consequently also that of the reel 8. During the rotation of the reel 8, the spring 35 will have been free to exert its action and will have made the pinion 13 revolve, and consequently also the pinion 11 and the spool 6, and on the latter a piece of sensitive surface will have been wound for a length equal to that of the circumference of the reel 8, and therefore equal to that of the photograph just taken.

During the movement of the release lever 25, the hook 48 will have moved the toothed disc 50 by one degree, and a needle fixed on the box of the camera will indicate the movement of the sensitive surface just effected. (If, for example, the 50th photograph has just been taken, the needle will point to the number 50). As has been said, since the arm 51, bearing the hook 48, has a spring action, and since the disc 50 can only turn in the one direction, when the exposure release lever 25 returns to its position at rest the hook 48 will bend downwards and therefore cannot push the disc 50 back again.

Having now particularly described and ascertained the nature of my invention, and in what manner the same is to be performed, I declare that what I claim is:—

1. In a roll film camera, a film supply spool, a resiliently actuated film winding spool, a film controlling roller engaging the film between the film supply spool and the film winding spool, and escapement mechanism including a pivoted lever normally engaging said controlling roller to prevent rotation thereof, a lever pivoted independently of the first mentioned lever normally out of engagement with said controlling roller movable to temporarily engage said controlling roller to prevent rotation thereof, and means for operating said levers to permit a single rotation of the controlling roller.

2. In a roll film camera, a film supply spool, a resiliently actuated film winding spool, a film controlling roller engaging the film between the film supply spool and the film winding spool, means normally engaging said controlling roller to prevent rotation thereof, means mounted independently of the means normally engaging said controlling roller and normally out of engagement with said controlling roller movable to temporarily engage and hold said controlling roller against rotation, means for moving the means normally engaging the controlling roller out of engagement with said roller and for moving the means normally out of engagement with the controlling roller into engagement with the controlling roller, and means for returning the means normally out of engagement with the controlling roller and the means normally in engagement with the controlling roller to their normal positions, the return of the means normally in engagement with the controlling roller to normal position being retarded whereby a single rotation of the controlling roller is permitted.

3. In a roll film camera, a film supply spool, a resiliently actuated film winding spool, a film controlling roller engaging the film between the film supply spool and the film winding spool provided at one end with two projections, a pivoted lever normally engaging one of said projections to prevent rotation of the controlling roller, a second lever normally out of engagement with the second projection movable to temporarily engage the second projection to hold the controlling roller against rotation, means for swinging the first pivoted lever out of engagement with the first projection and for swinging the second lever into engagement with the second projection, and means for returning the levers to their normal positions, the return of the first lever to normal position being retarded whereby a single rotation of the controlling roller is permitted.

4. In a roll film camera, a film supply spool, a resiliently actuated film winding spool, a film controlling roller engaging the film between the film supply spool and the film winding spool, said controlling roller provided at one end with two projections, a slidable and swingable lever normally engaging one of said projections on said controlling roller to normally hold said roller against rotation, a pivoted lever having a hook portion at one end normally out of engagement with the second projection movable to temporarily engage the second projection to hold the controlling roller against rotation, and means connecting the two levers.

5. In a roll film camera, a film supply spool, a spring actuated film winding spool, a film controlling roller engaging the film between the film supply spool and the film winding spool provided at one end with two projections, a slidable and swingable lever normally engaging one of said projections on said controlling roller to normally hold said roller against rotation, a spring urging said lever against said projection, a pivoted bell crank lever having a hook portion at one end normally out of engagement with the second projection movable to temporarily engage the second projection to hold the controlling roller against rotation, and a link connected at one end by a pivot to said slidable and swingable lever and connected at the other end by a pin and slot connection to the pivoted bell crank lever.

Signed at Milan, Italy, this 23rd day of October, 1922.

ANGELO LEGNANI.